H. CARLISLE, Jr., dec'd,

F. CAMPBELL, Adm'r., assignor by mesne assignments, to J. A. RILEY & C. S. FREER.

Bracelets.

No. 9,482. Reissued Nov. 30, 1880.

Witnesses
Phiepo Clauss
C. J. Hedrick

Assignees of
Henry Carlisle Jr. Inventor
John A. Riley & Charles S. Freer
by A. Pollok
their attorney.

N. PETERS, PHOTO-LITHOGRAPHER, WASHINGTON, D. C.

UNITED STATES PATENT OFFICE.

JOHN A. RILEY AND CHARLES S. FREER, OF NEW YORK, N. Y., ASSIGNEES, BY MESNE ASSIGNMENTS, OF FRANK CAMPBELL, ADMINISTRATOR OF HENRY CARLISLE, JR., DECEASED.

BRACELET.

SPECIFICATION forming part of Reissued Letters Patent No. 9,482, dated November 30, 1880.

Original No. 108,683, dated October 25, 1870. Application for reissue filed June 1, 1880.

*To all whom it may concern:*

Be it known that HENRY CARLISLE, Jr., late of the city and county of Philadelphia, and State of Pennsylvania, did invent a new and useful Improvement in Bracelets, of which invention the following is a specification.

This invention relates to bracelets formed with curved arms jointed or united by a hinge-connection, and capable of a sufficient movement at their outer ends to allow the bracelet to be placed around the wrist of the wearer; and its object is, mainly, the production of an improved bracelet capable of self-closing.

The invention consists in the application to the joint of a bracelet of one or more springs for the purpose specified, and in the particular construction and combination of parts in a spring-bracelet—namely, (*a*,) the combination, with the curved arms of the bracelet, of an elastic strip, which constitutes as well the hinges as the spring; (*b*,) the construction of the ends of the strip so as to form a catch; (*c*,) the application of a spiral-spring hinge for connecting the curved arms; (*d*,) the construction of a spring-bracelet in two curved parts or arms connected by a single joint, so as to open in substantially the same plane, and provided with a spring applied at the joint, with its ends extending into and inclosed by the said curved parts.

In order that the invention and the manner of carrying it into effect, or of making and using the same, may be fully understood, reference is made to the accompanying drawings, which form a part of this specification and illustrate the improvements constituting the present invention.

Figure 1:
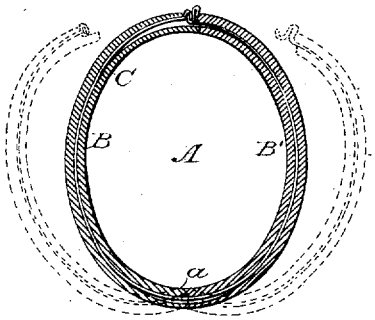
Figure 2:
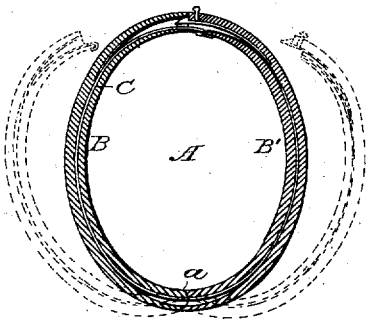
Figure 3:
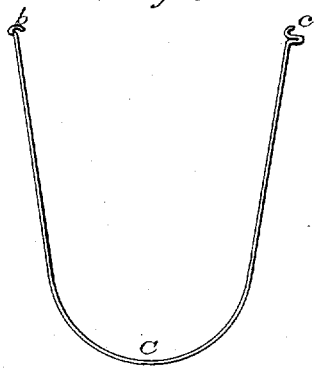
Figure 4:
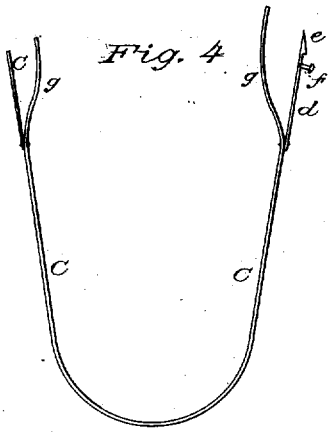
Figure 5:
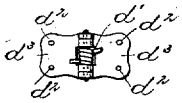

Figure 1 is a view, in central section, of a bracelet embodying the invention, except that part relating to the spiral spring, and Fig. 2 a similar view of a modification thereof. Figs. 3 and 4 show the shape of the elastic strips or springs used in the bracelets in Figs. 1 and 2 respectively. Fig. 5 represents a hinge combined with a spiral spring, for application to the joint of a bracelet, and Fig. 6 a hinge with a flat spring.

Similar letters of reference indicate corresponding parts in the several figures.

A may represent a bracelet, which, in the present case, consists of two parts, B B′, made of suitable material and of any desired shape and configuration.

C represents a strip of elastic material, by preference of metal, which is passed through the bracelet in the direction of its length. It will be seen that the joint *a* of the parts of the bracelet is thus provided with a hinge which holds the parts together and permits the opening and closing of the bracelet.

Figure 6:
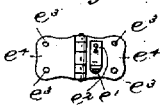

The strip C is bent so as to form a curved spring, which, when inserted in the bracelet, will tend to close it. This feature of self-closing constitutes more particularly the subject of the present invention; but the strip C, it will be seen, could be made a spring to throw open the bracelet, and would, in this connection also, serve as a hinge to the curved arms. The same result with reference to the automatic action of the bracelet is produced if either of the spring-hinges shown in Figs 5 and 6 is applied to the joint.

As shown in Fig. 5, $d^3$ $d^3$ are the two leaves of the hinge, connected by a pivot, and $d'$ the spiral spring, the opposite ends of which bear upon said leaves, and, when the hinge is secured to the bracelet at the joint, act to impart motion to the curved arms.

It is not deemed necessary to describe the manner of attaching the hinge, as this can be readily done by one skilled in the art.

In the drawings, holes $d^2$ are shown for the reception of suitable rivets.

In Fig. 6, $e^4$ $e^4$ are the leaves of the hinge; $e'$, a flat spring fastened at $e^2$ to one of the leaves, and with its free end extending above the surface of the leaf; and $e^3$, the rivet-holes.

A catch or fastening for the bracelet may be formed in various ways.

In Fig. 1 one end of the strip C is shown bent or turned into a hook, *b*, and the other end bent or turned into a corresponding catch, *c*, whereby when the two parts are brought into contact they will engage with each other after the manner of a snap, and thus hold the bracelet in a closed state.

The bracelet is readily opened by pressing on the head of the catch *c*, which operation disengages it from the hook *b*, and the two portions B B′ may be then separated so as to open the bracelet.

In Fig. 4 a modification is shown wherein the fastening devices are secured to the strip C. A hooked piece, *e*, is riveted or otherwise attached near one end of said strip, and a piece, *d*, with a suitable eye or catch, *e*, is attached near the other end.

It is evident that the operation of this part is similar to that already described.

A presser, *f*, is secured or formed with the hooked piece *e*, for releasing the fastening; but its construction and operation are well known and require no further description.

The ends *g g* of the strip C, Fig. 4, will be bent or turned over the ends of the parts B B′, and form means of firmly retaining the elastic strip in position.

The invention is readily applicable to bracelets of any material, whether gold, vulcanite, or otherwise, and will be found to be a simple and practical device for the purpose intended.

Having thus described the invention of said HENRY CARLISLE, Jr., deceased, what is claimed as new, and sought to be secured by Letters Patent, is—

1. In a bracelet having the parts thereof jointed together so as to turn upon the connected extremities, a spring applied to the joint and arranged to close the bracelet, substantially as and for the purpose described.

2. An elastic strip applied to a bracelet and constituting its hinge and spring, substantially as set forth.

3. The strip C, arranged within the bracelet, forming its joint and hinge, and having its ends constitute the catch or fastening, substantially as and for the purpose described.

4. A bracelet comprising curved parts or arms united by a hinge-connection, combined with a spiral spring, the opposite ends of which spring act to impart motion to the outer ends of said curved parts, substantially as described.

5. A spring-bracelet composed of two curved parts or arms so connected by a single joint as to open in substantially the same plane, and provided with a spring applied at the joint with its ends extending into and inclosed by the said curved parts, as set forth.

6. A bracelet having two curved arms joined to each other by a hinge-connection, and operated upon by a spring between the arms, tending to press the two parts together around the arm of the wearer, substantially as and for the purpose described.

7. A two-part bracelet comprising, in combination with the two curved arms connected together at one end by a joint which allows said arms to turn upon their connected extremities, so that the opposite ends approach or recede from each other, and forming, when in their normal position, a prolongation each of the other, a spring common to and connected with both of said arms, so as to return them, when opened, to their normal position, substantially as described.

In testimony whereof we have signed this specification in the presence of two subscribing witnesses.

JOHN A. RILEY.
CHAS. S. FREER.

Witnesses:
JOHN H. HENSHAW,
JOHN MCCLURE.